United States Patent
O'Gorman et al.

(10) Patent No.: US 10,979,165 B2
(45) Date of Patent: Apr. 13, 2021

(54) GRID NETWORK FOR LAYER ONE OPTICAL CONNECTIVITY FROM EDGE TO CLOUD

(71) Applicant: Microsoft Technology Licensing, LLC, Redmond, WA (US)

(72) Inventors: Simon Peter O'Gorman, Newmarket (GB); Brandon Eugene Raciborski, Hudson, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 16/232,886

(22) Filed: Dec. 26, 2018

(65) Prior Publication Data
US 2020/0213024 A1 Jul. 2, 2020

(51) Int. Cl.
*H04J 14/00* (2006.01)
*H04J 3/16* (2006.01)
(Continued)

(52) U.S. Cl.
CPC ......... *H04J 3/1658* (2013.01); *H04J 14/021* (2013.01); *H04J 14/0282* (2013.01);
(Continued)

(58) Field of Classification Search
CPC .... H04J 14/02; H04J 14/0227; H04J 14/0212; H04J 14/0286; H04J 14/021;
(Continued)

(56) References Cited

U.S. PATENT DOCUMENTS

| 8,867,915 B1 | 10/2014 | Vahdat et al. | |
| 2005/0185959 A1* | 8/2005 | Kinoshita | H04J 14/0286 398/59 |

(Continued)

FOREIGN PATENT DOCUMENTS

EP 1073307 A2 1/2001

OTHER PUBLICATIONS

He, Jianfei, "Software-Defined Transport Network for Cloud Computing", In Proceedings of Optical Fiber Communication Conference and Exposition and the National Fiber Optic Engineers Conference, Mar. 17, 2013, 03 Pages.
(Continued)

*Primary Examiner* — Hanh Phan
(74) *Attorney, Agent, or Firm* — Davin Chin; Chin IP, PLLC

(57) ABSTRACT

The disclosed technology is generally directed to optical networking. In one example of the technology, a layer one optical connection between an edge node and a first cloud data center node along a reserved spectrum is controlled. Controlling the layer one optical connection between the edge node and the first cloud data center node includes controlling photonics along the reserved spectrum in an optical path from the edge node to a stub of an optical route node. The optical route node is in an optical route between the first cloud data center node and a second cloud data center node. Controlling the layer one optical connection between the edge node and the first cloud data center node also includes controlling photonics along the reserved spectrum from the optical route node to the first data center node.

20 Claims, 5 Drawing Sheets

(51) Int. Cl.
*H04J 14/02* (2006.01)
*H04Q 11/00* (2006.01)

(52) U.S. Cl.
CPC . *H04Q 11/0062* (2013.01); *H04Q 2011/0064* (2013.01); *H04Q 2011/0073* (2013.01)

(58) Field of Classification Search
CPC ........... H04Q 11/0003; H04Q 11/0005; H04Q 11/0066; H04Q 11/0062; H04L 45/50; H04L 45/22; H04L 43/0823; H04L 43/12; H04L 43/04
USPC .... 398/79, 45, 48, 49, 83, 2, 3, 4, 5, 33, 38, 398/58, 59, 51, 53; 370/352, 392, 389, 370/468, 465
See application file for complete search history.

(56) References Cited

U.S. PATENT DOCUMENTS

2015/0295673 A1* 10/2015 Zhang ..................... H04L 45/22
398/5
2018/0026724 A1* 1/2018 Tanimura ............. H04B 10/616
398/79

OTHER PUBLICATIONS

"International Search Report and Written Opinion Issued in PCT Application No. PCT/US2019/065576", dated Mar. 25, 2020, 30 Pages.

* cited by examiner

GRID NETWORK FOR LAYER ONE OPTICAL CONNECTIVITY FROM EDGE TO CLOUD

BACKGROUND

A business that wishes to send large volumes of data into the cloud typically obtains Enterprise-grade connectivity to a data center or the like. Among other things, this may involve purchasing an on-premise footprint in the data center. The business may then access the cloud through the Enterprise-grade connectivity that it has to the data center at the Internet Protocol ("IP") level. This process may be relatively expensive.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to optical networking. In one example of the technology, a layer one optical connection between an edge node and a first cloud data center node along a reserved spectrum is controlled. In some examples, controlling the layer one optical connection between the edge node and the first cloud data center node includes controlling photonics along the reserved spectrum in an optical path from the edge node to a stub of an optical route node. In some examples, the optical route node is in an optical route between the first cloud data center node and a second cloud data center node. In some examples, controlling the layer one optical connection between the edge node and the first cloud data center node also includes controlling photonics along the reserved spectrum from the optical route node to the first data center node.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
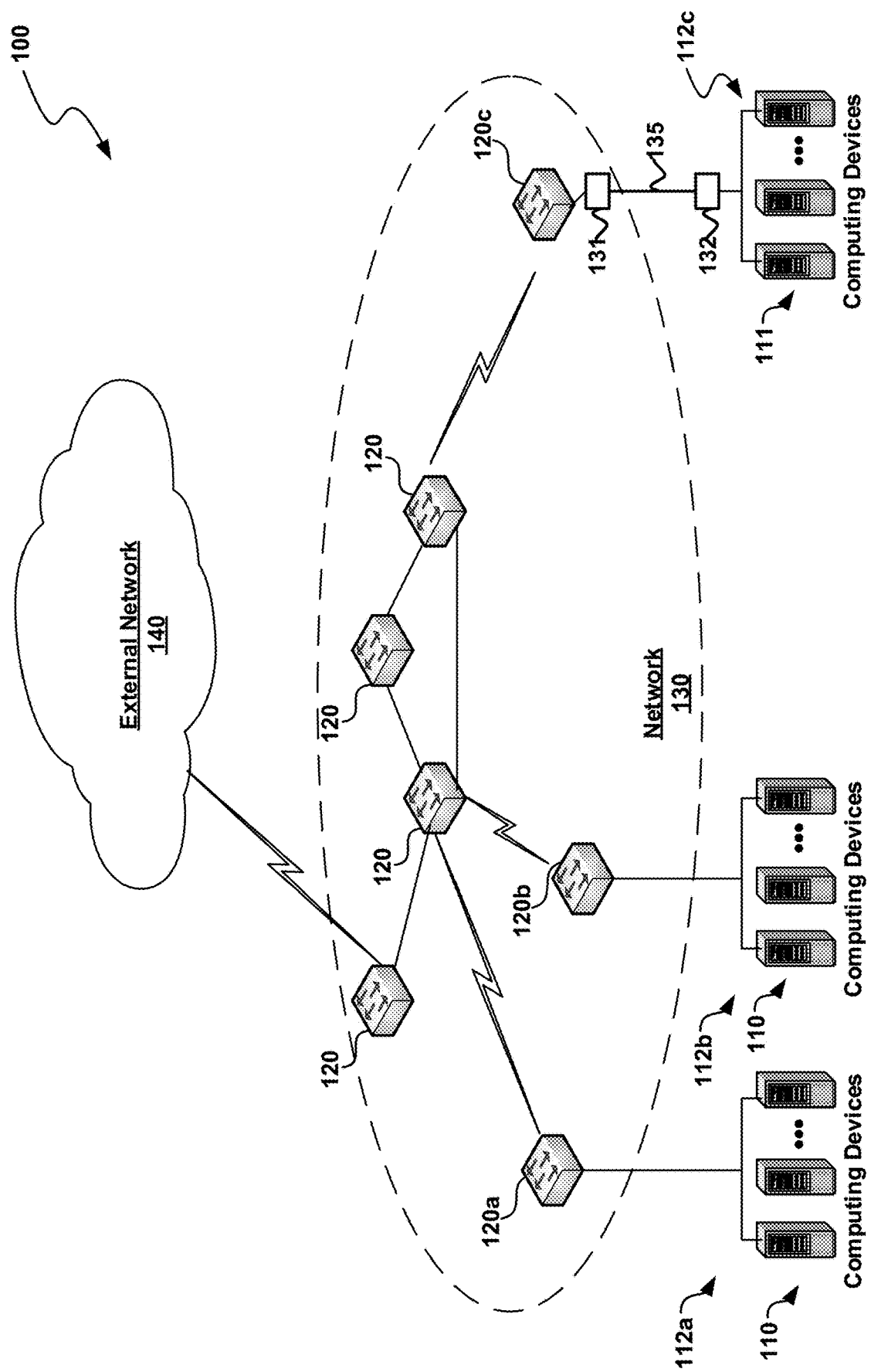
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks.

Briefly stated, the disclosed technology is generally directed to optical networking. In one example of the technology a layer one optical connection between an edge node and a first cloud data center node along a reserved spectrum is controlled. In some examples, controlling the layer one optical connection between the edge node and the first cloud data center node includes controlling photonics along the reserved spectrum in an optical path from the edge node to a stub of an optical route node. In some examples, the optical route node is in an optical route between the first cloud data center node and a second cloud data center node. In some examples, controlling the layer one optical connection between the edge node and the first cloud data center node also includes controlling photonics along the reserved spectrum from the optical route node to the first data center node.

References to "layer one," "layer two," and "layer three" herein refer to the Open Systems Interconnection ("OSI") model. A layer one connection is a physical connection that uses a transmission and reception of raw bit streams over a physical medium.

In some examples, a physical layer one optical connection is established between a customer premise and the cloud. In this way, in some examples, the business can send large volumes of data, such as terabits of data, directly from the customer premise to the cloud, directly via a layer one optical connection, without purchasing a footprint in the data center. The data center may have an optical route to another data center, where the route may include optical amplification at suitable intervals along the route. For instance, in some examples, the optical route may be a dark fiber route that includes an in-line amplifier ("ILA") hut about every 80 km.

At one or more of these ILAs, or at optical nodes or modules along the route other than ILAs, a stub may be included that includes an optical path to physical areas other than the optical route between the data centers. An optical path may be established from the stub to an optical node for a customer premise. This optical path along with the optical route between data centers may be used as an optical route from the customer premise to one of the data centers. In this way, the optical connection may be established between a customer premise and the data center.

The optical path from the stub to the customer premise may include fiber provided by a last mile provider that leads to the customer premise. A dark fiber route generally only provides communication between two data centers, including ILAs along the dark fiber route to maintain the signal along the route. However, according to some examples of the disclosure, the dark fiber route can be stubbed at one or more of the ILAs, and an optical path created from the stub to a customer premise, including fiber provided by a last mile provider that leads to the customer premise. This may provide a grid network through which the dark fiber route and last mile provider carrier networks are combined in order to provide a way for customer premises to have a direct, layer one physical optical interconnect to the cloud via the grid network.

Illustrative Devices/Operating Environments

FIG. 1 is a diagram of environment 100 in which aspects of the technology may be practiced. As shown, environment 100 includes computing devices 110, as well as network nodes 120, connected via network 130. Environment 100 further includes computing devices 111, connected to network 130 via optical path 135. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices no to external network 140, e.g., the Internet or an intranet. For example, network nodes 120 may include switches, routers, hubs, network controllers, or other network elements. In certain examples, computing devices 110 and 111 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 and in may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 and 111 may be individually configured to provide computing, storage, and/or other suitable computing services.

Optical path 135 may provide a layer one optical connection between optical node 132, which is connected to computing devices 111, and optical node 131, which is connected to external network 140 via network 130.

Figure 5:
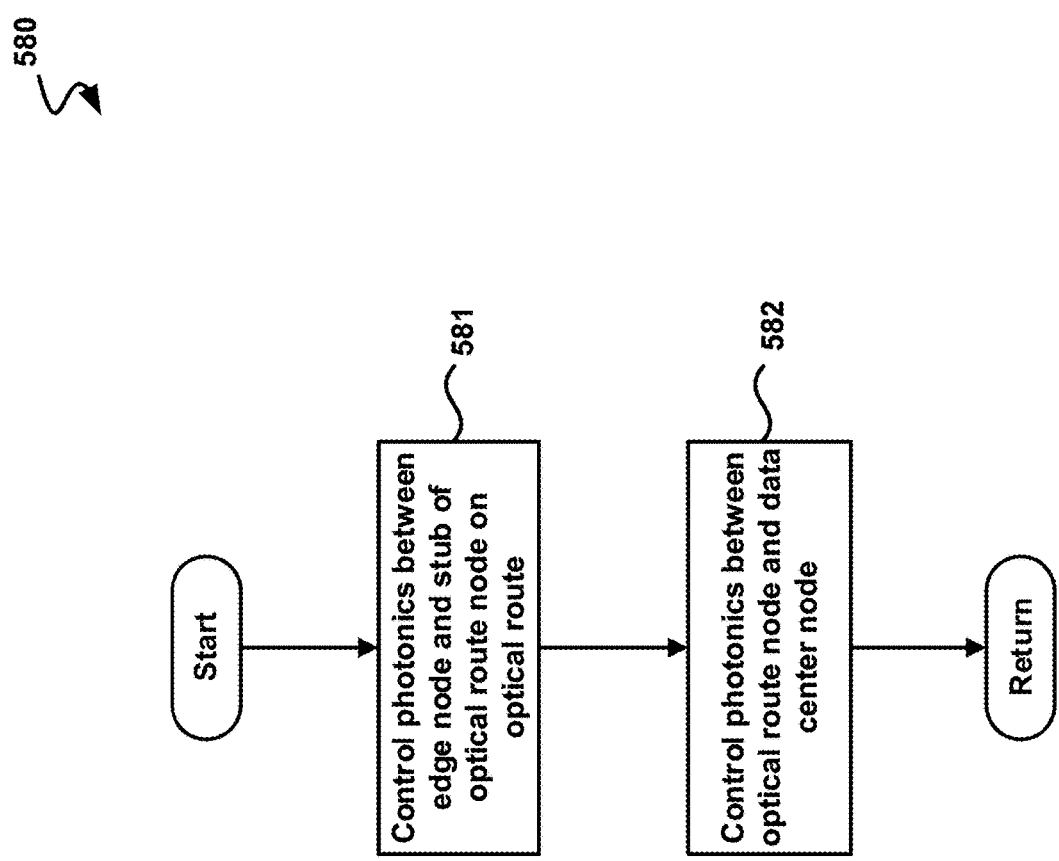
FIG. 5 is a flow diagram illustrating an example of a process, in accordance with aspects of the present disclosure.

In some examples, one or more of the computing devices 110 and 111 may perform one or more of the processes as illustrated in FIG. 5, as discussed in greater detail below.

Illustrative Computing Device

Figure 2:
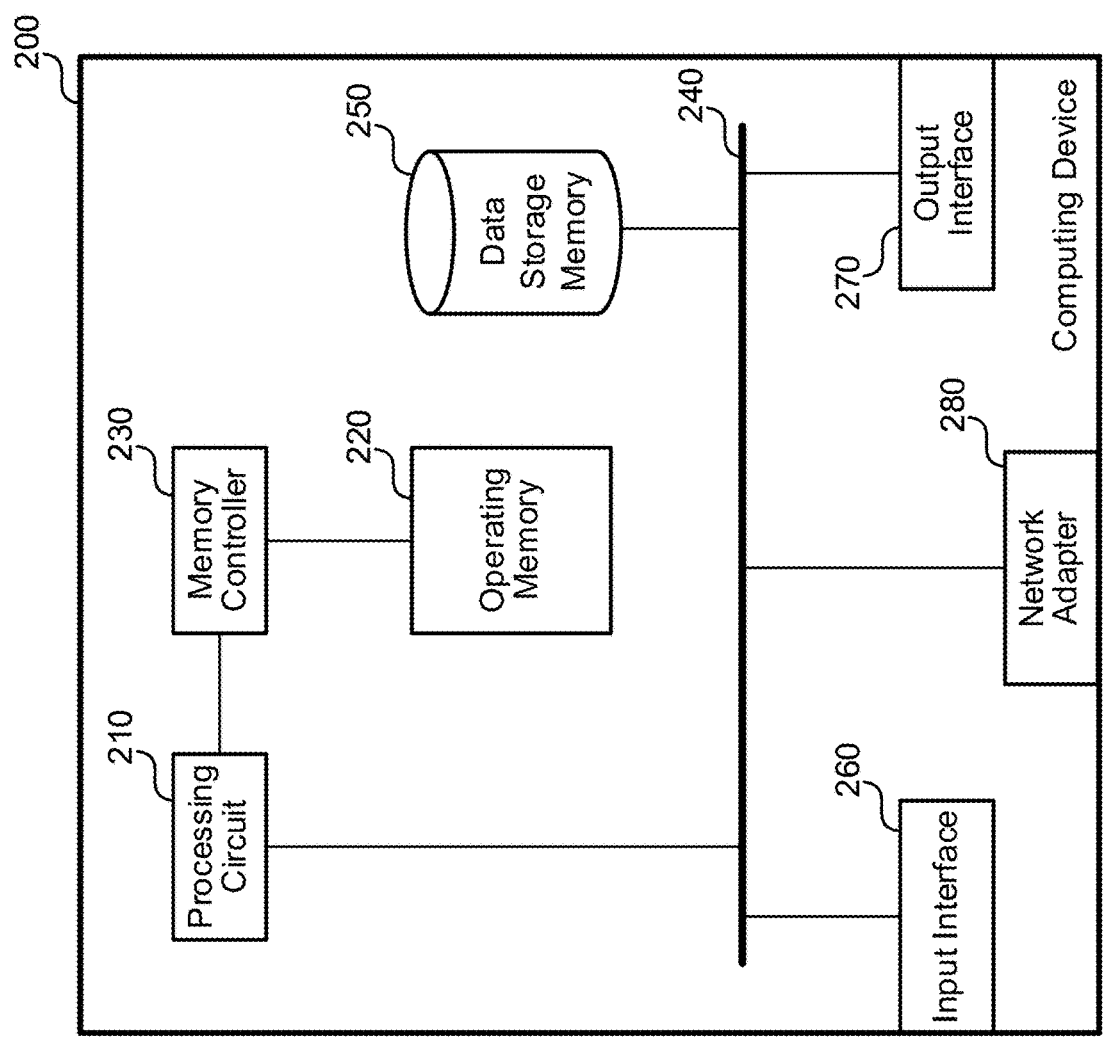
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate ("DDR4") memory, $3^{rd}$ generation double data rate ("DDR3") memory, other dynamic random access memory ("DRAM"), High Bandwidth Memory ("HBM"), Hybrid Memory Cube memory, 3D-stacked memory, static random access memory ("SRAM"), magnetoresistive random access memory ("MRAM"), pseudorandom random access memory ("PSRAM"), or other memory, and such memory may comprise one or more memory circuits integrated onto a DIMM, SIMM, SODIMM, Known Good Die ("KGD"), or other packaging. Such operating memory modules or devices may be organized according to channels, ranks, and banks. For example, operating memory devices may be coupled to processing circuit 210 via memory controller 230 in channels. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory ("RAM"), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output ("GPIO"), and/or the like. Moreover, input interface 260 and/or output interface 270 may include or be interfaced to any number or type of peripherals. In some examples, one or more input interfaces 260 may be used to directly connect to imaging devices. For example, computing device 200 may be connected to a camera, scanner, or other imaging device. Computing device 200 may also receive images from other computing devices.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line ("DSL") adapter. Network adapter 280 may also include a wireless network adapter, for example, a Wi-Fi adapter, a Bluetooth adapter, a ZigBee adapter, a Long Term Evolution ("LTE") adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, such as, for examples, one or more of the processes discussed in greater detail below.

Illustrative System

Figure 3:
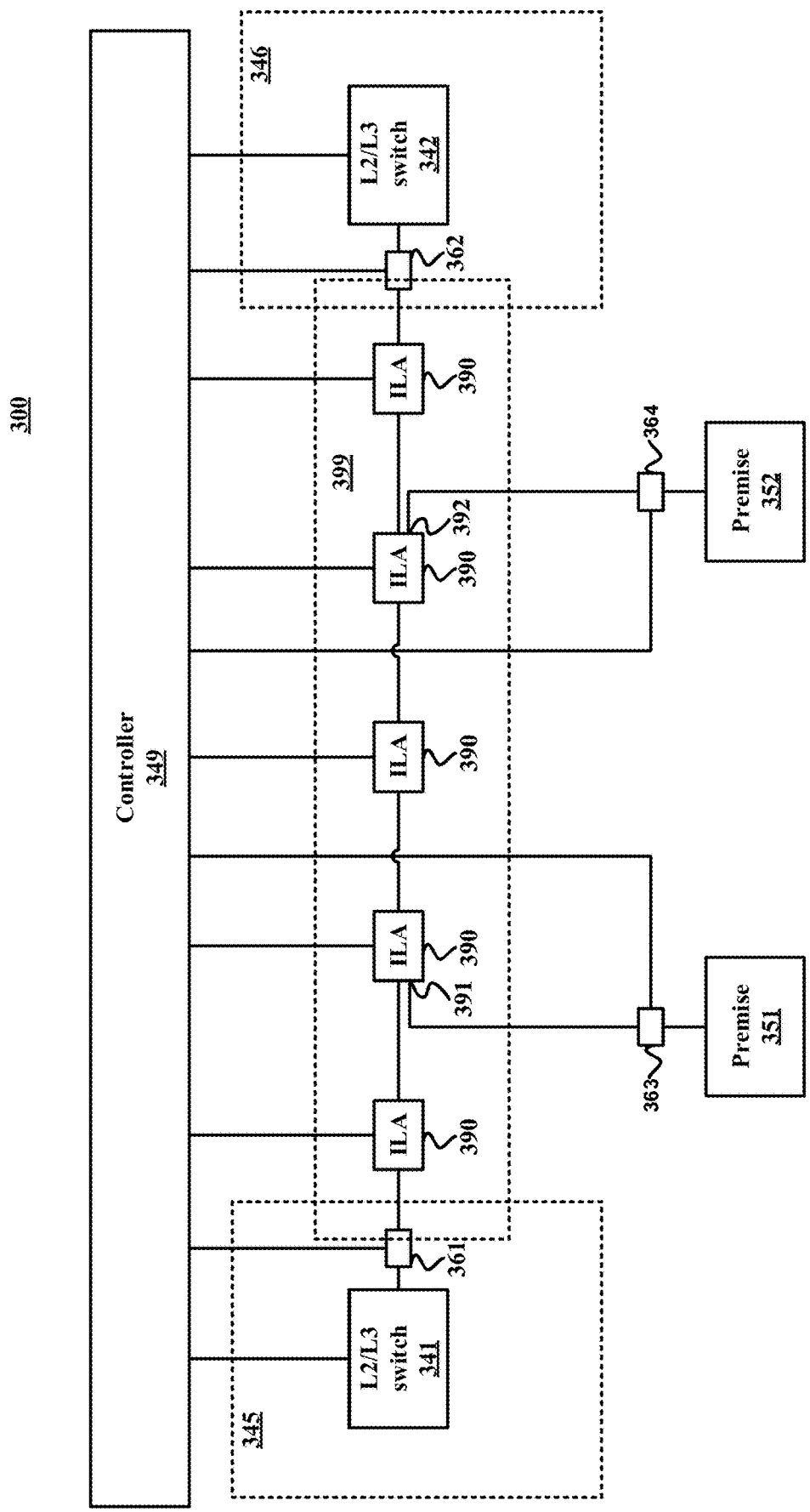
FIG. 3 is a block diagram illustrating an example of a system.

FIG. 3 is a functional block diagram of an example system 300. System 300 may include data center 345, data center 346, controller 349, optical route 399, ILAs 390 along optical route 399, optical nodes 363 and 364, and premises 351 and 352. Some of the ILAs 390 may have a stub, such as stub 391 and stub 392. Data center 345 may include L2/L3 switch 341, optical node 361, and other components not shown in FIG. 3. Data center 346 may include L2/L3 switch 342, optical node 362, and other components not shown in FIG. 3. Although controller 349 is shown as a separate device in the example illustrated in FIG. 3, in some examples, controller 349 may be part of data center 345 and/or data center 346.

Typically, a business that wishes to send large volumes of data into the cloud obtains Enterprise-grade connectivity to a data center or the like. Among other things, this may involve purchasing an on-premise footprint in the data center. The business may then access through cloud through the Enterprise-grade connectivity that it has to the data center at the internet protocol ("IP") level. This process may be relatively expensive.

Some data centers may be connected via an optical route. For examples, there is an optical route, for example a dark fiber route, between a data center in Amsterdam and a data center in Frankfurt. The optical route may include an ILA about once every 80 km along the optical route. A customer premise in this general area that wishes to send large volumes of data into the cloud would typically need to purchase a data footprint in one of these two data centers and get Enterprise connectivity from their customer premise to the data center in which they purchased the data footprint.

In some example, a stub may be provided on one or more nodes or modules on optical route 391, such as one or more of the ILAs 390, such as stub 391 and stub 392. Although stubs are shown in ILAs in FIG. 3, in other examples, stubs may be included along an optical module or optical node other than an ILA, such as an optical switch, optical multiplexing device, optical branching device, optical amplifier, optical connector, optical converter, optical repeater, optical transceiver, optical transponder, optical muxponder, one or more of the above, and/or the like. In some examples, the ILA is coupled to a reconfigurable optical add-drop multiplexer ("ROADM"), and one of the ROADM terminals serves at the stub.

In some examples, a business can obtain a layer one optical connection to the cloud by gaining access to, building, or causing to be built an optical path from an optical node (e.g., 363, 364) on the premise to a stub (e.g., stub 391 or stub 392) of optical route 399. At least part of the path from the stub (e.g., 391 or 392) to the optical node (e.g., 363 or 364) may include fiber provided by a last mile fiber provider that leads to the location of the premise (e.g., 351 or 352). The path from the optical node at the premise to the stub, along with optical route 399, may be used to provide an automated layer one optical connection between the premise and data center 345 or data center 346.

In some examples, L2/L3 switch 341 is a layer two and/or layer three switch in data center 345 that may be used to connect to the cloud. In some examples, L2/L3 switch 342 is a layer two and/or layer three switch in data center 346 that may be used to connect to the cloud. In some examples, optical node 361 is an optical node in data center 345 and optical node 362 is an optical node in data center 346. In some examples, optical route 399 is an optical route between data center 345 and data center 346. More specifically, in some examples, optical route 391 is an optical route between optical node 361 of data center 345 and optical node 362 of data center 346. In some examples, optical route 399 is an open optical line system ("OLS") with photonics in optical route 399 controlled by software in controller 349 via software-defined networking ("SDN"). Communication between optical node 361 and L2/L3 switch 341 may occur via an optical to electrical conversion, and vice versa. Similar conversion may occur in communications between optical node 362 and L2/L3 switch 342, optical node 363 and premise 351, and optical node 364 and premise 352. In some examples, a premise such as premise 351 and/or premise 352 may include multiple buildings with a Multi-protocol Label Switching ("MPLS") network to connect the buildings.

Different carriers may be used as last mile fiber providers, so that, for example, the last mile fiber provider to premise 351 may be a different carrier than the last mile fiber provider to premise 352.

As discussed above, optical route 399, with photonics control by controller 349, may be an OLS. In some examples, this OLS, in conjunction with carrier optical transport networks, such as the optical paths from stubs (e.g., 391 and 392) from the optical route 399 to optical nodes of premises (such as optical node 363 of premise 351 and optical node 364 or premise 352) form a digital grid network that uses a hybrid approach of OLS and carrier transport networks.

In some examples, each wave on the photonic spectrum can be provisioned to go to a different data center. In some examples, a provider of cloud services to premises such as premise 351 and premise 352 need not own optical route 399 entirely, but may instead in some examples pay for the use of particular channels, or may own optical route 399 and lease back some channels. In some examples, particular channels can then be allocated to particular premises. In this way, in these examples, particular channels may be allocated for premise 351 for layer one interconnection between premise 351 and a data center (e.g., data center 345 or data center 346), and other particular channels may be allocated for premise 353 for layer one interconnection between premise 352 and a data center (e.g., data center 345 or data center 346). The particular channels allocated may constitute a reserved spectrum. Some existing optical routes may currently be significantly underused, so that many channels for such optical routes may currently be available in such optical routes. Controller 349 may provide photonic control for some channels on route 399 and not others in some examples; for instance, different channels may be controlled by different entities, so that controller 349 provides photonic channels over those channels for which controller 349 is authorized to control.

Controller 349 may provide photonic control of a layer one optical connection between a premise, such as premise 351, to a data center, such as data center 345 or data center 346, for the channels allocated to the premise. The photonic control may include photonic control of the optical path from, for example, optical node 363 to stub 391, and the optical path from the ILA 390 associated with stub 391 to the data center. In some examples, the customer associated with premise 351 can turn up or down the amount of capacity needed, which can the accordingly be provisioned to the customer.

In some examples, a layer one optical connection is thereby provided from premise 351 to data center 345 or data center 346. In some examples, the data center in turn provides connectivity to the cloud. In some examples, since the connection to the data center is a layer one connection, the customer thereby has a direct connection to the cloud. Further network communication to other data centers and other network locations may be accomplished via the cloud. The customer may also choose to change the connection from, for example a connection between premise 351 to data center 345, to a connection between premise 351 and data center 346.

Providing services to customers via a layer one optical connection to a data center, to in turn provide access to the cloud, may be accomplished as follows. Available routes are identified, and any additional needed infrastructure can be built or acquired. Then, within the appropriate area of any corresponding optical route, services may be made available to potential customers. Potential customers can be informed of available last mile fiber providers that can provide last mile fiber so that the customer can connect via an optical path from the customers premise to a stub along the optical route.

Once the optical path from the premise to the stub is in place, a set of components may be configured and then delivered to the customer. The set of components may include optical node 363, pre-configured for a photonic configuration, including the parameters needed to connect to the location. Upon receiving optical node 363, the customer may then cable up optical node 363. In some examples, once the pre-configured optical node is cabled up, the photonic connection is automated.

Once optical node 363 is cabled up, optical node 363 may be polled by the data center to which node 363 was pre-configured to connect. Next, optical node 363 may connect based on the pre-configured photonic configuration and further based on control from controller 349. In some examples, multiple networks can be connected including the dark fiber route and multiple different last mile providers.

In some examples, the customer does not need to have a footprint on the data center premise, does not need to interconnect to the data center on the IP level, and can achieve a truly photonic automated direct physical connect from the customer premise directly to the cloud.

Figure 4:
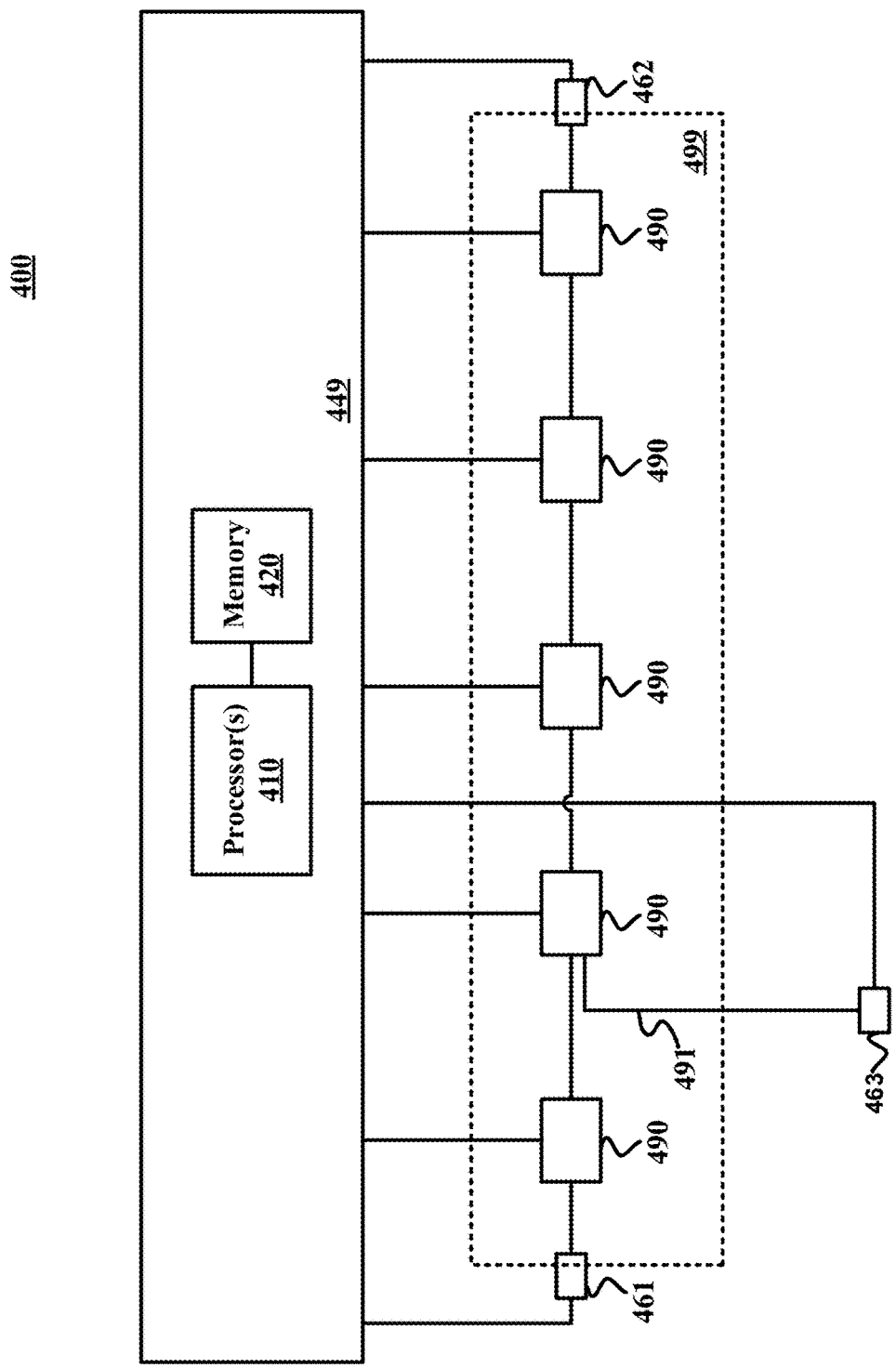
FIG. 4 is a block diagram illustrating another example of a system.

FIG. 4 is a functional block diagram of an example system 400. In some examples, system 400 is an example of a subset of system 300 of FIG. 3. System 400 may include controller 449, edge node 463, optical route 499, optical nodes 490 along optical route 499, first data center cloud node 461, and second data center cloud node 462. One of the optical node 490 along optical route 499 may include stub 491. Controller 449 may include memory 420 and one or more processors 410.

In some examples, memory 420 is adapted to store run-time data for the controller 499. In some examples, processor(s) 410 are adapted to execute processor-executable code that, in response to execution, enables the controller 499 to perform actions.

Controller 449 may be configured to control a layer one optical connection between edge node 463 and first cloud data center node 461 along a reserved spectrum. Controlling the layer one optical connection between edge node 463 and first cloud data center node 461 may include controlling photonics along the reserved spectrum in an optical path from edge node 463 to stub 491 of one of the optical route nodes 490. As previously discussed, in some examples, the optical route nodes 490 are each in/along optical route 499. Controlling the layer one optical connection between edge node 463 and the first cloud data center node 461 may include controlling photonics along the reserved spectrum from the optical route node that includes stub 490 to first data center node 461.

Illustrative Process

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

FIG. 5 illustrates an example dataflow for a process (580) for training. In some examples, process 580 is performed by a device, such as device 200 of FIG. 2, controller 349 of FIG. 3, or controller 449 of FIG. 4. Process 400 may control a layer one optical connection between an edge node and a first cloud data center node along a reserved spectrum.

In the illustrated example, step 581 occurs first. At step 581, in some examples, photonics along the reserved spectrum in an optical path from the edge node to a stub of an optical route node is controlled. In some examples, the optical route node is in an optical route between the first cloud data center node and a second cloud data center node. At step 582, in some examples, photonics along the reserved spectrum from the optical route node to the first data center node are controlled. The process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory adapted to store run-time data for the device, and at least one processor that is adapted to execute processor-executable code that, in response to execution, enables the device to perform actions, including:
controlling a layer one optical connection between an edge node and a first cloud data center node along a reserved spectrum, such that controlling the layer one optical connection between the edge node and the first cloud data center node includes:
controlling photonics along the reserved spectrum in an optical path from the edge node to a stub of an optical route node, wherein the optical route node is in an optical route between the first cloud data center node and a second cloud data center node; and
controlling photonics along the reserved spectrum from the optical route node to the first data center node.

2. The apparatus of claim 1, wherein the optical route includes a plurality of in-line amplifiers (ILAs) including a first ILA, and wherein the optical route node is associated with the first ILA.

3. The apparatus of claim 1, wherein the optical route is an open optical line system, and wherein the optical path is an optical carrier transport network.

4. The apparatus of claim 1, the actions further including enabling a capacity of the layer one optical connection to be increased, and enabling the capacity of the layer one optical connection to be decreased.

5. The apparatus of claim 1, wherein controlling the layer one optical connection includes controlling the layer one optical connection with software-defined networking (SDN).

6. The apparatus of claim 1, the actions further including changing the layer one optical connection between the edge node and the first cloud data center node to an optical connection between the edge node and the second cloud data center node.

7. The apparatus of claim 1, further comprising:
controlling a layer one optical connection between another edge node and the first cloud data center node along another reserved spectrum.

8. The apparatus of claim 7, wherein controlling the layer one optical connection between said another edge node and the first cloud data center node includes controlling photonics in another optical path from said another edge node to another stub of the optical route, wherein the optical path includes a carrier optical transport network associated with a first carrier, and wherein said another optical path includes another carrier optical transport network associated with a second carrier.

9. A method, comprising:
controlling an optical path between an edge node and a first cloud data center node for a plurality of channels, wherein controlling the optical path between the edge node and the first cloud data center node includes:
controlling an optical path for the plurality of channels from the edge node to a stub of an optical route node, wherein the optical route node is in an optical route between the first cloud data center node and a second cloud data center node; and
controlling an optical path for the plurality of channels from the optical route node to the first data center node.

10. The method of claim 9, wherein the optical route includes a plurality of in-line amplifiers (ILAs) including a first ILA, and wherein the optical route node is associated with the first ILA.

11. The method of claim 9, wherein the optical route is an open optical line system, and wherein the optical path from the optical route node to the first data center node is an optical carrier transport network.

12. The method of claim 9, further comprising enabling a capacity of the optical path to be increased, and enabling the capacity of the optical path to be decreased.

13. The method of claim 9, wherein controlling the optical path is accomplished with software-defined networking (SDN).

14. The method of claim 9, further comprising changing the optical path between the edge node and the first cloud data center node to an optical path between the edge node and the second cloud data center node.

15. A processor-readable storage medium, having stored thereon processor-executable code for computer network design, that, upon execution by at least one processor, enables actions, comprising:
performing control of photonic layer routing of a layer one optical connection between an edge node and a first cloud data center node along a reserved spectrum, wherein performing control of photonic layer routing between the edge node and the first cloud data center node includes:
performing control of photonic layer routing along the reserved spectrum in an optical path from the edge node to a stub of an optical route node, wherein the optical route node is in an optical route between the first cloud data center node and a second cloud data center node; and
performing control of photonic layer routing along the reserved spectrum from the optical route node to the first data center node.

16. The processor-readable storage medium of claim 15, wherein the optical route includes a plurality of in-line amplifiers (ILAs) including a first ILA, and wherein the optical route node is associated with the first ILA.

17. The processor-readable storage medium of claim 15, wherein the optical route is an open optical line system, and wherein the optical path is an optical carrier transport network.

18. The processor-readable storage medium of claim 15, the actions further comprising enabling a capacity of the layer one optical connection to be increased, and enabling the capacity of the layer one optical connection to be decreased.

19. The processor-readable storage medium of claim 15, wherein performing control of photonic layer routing of the layer one connection is accomplished with software-defined networking (SDN).

20. The processor-readable storage medium of claim 15, the actions further comprising changing the layer one optical connection between the edge node and the first cloud data center node to an optical connection between the edge node and the second cloud data center node.

* * * * *